Figure 1:
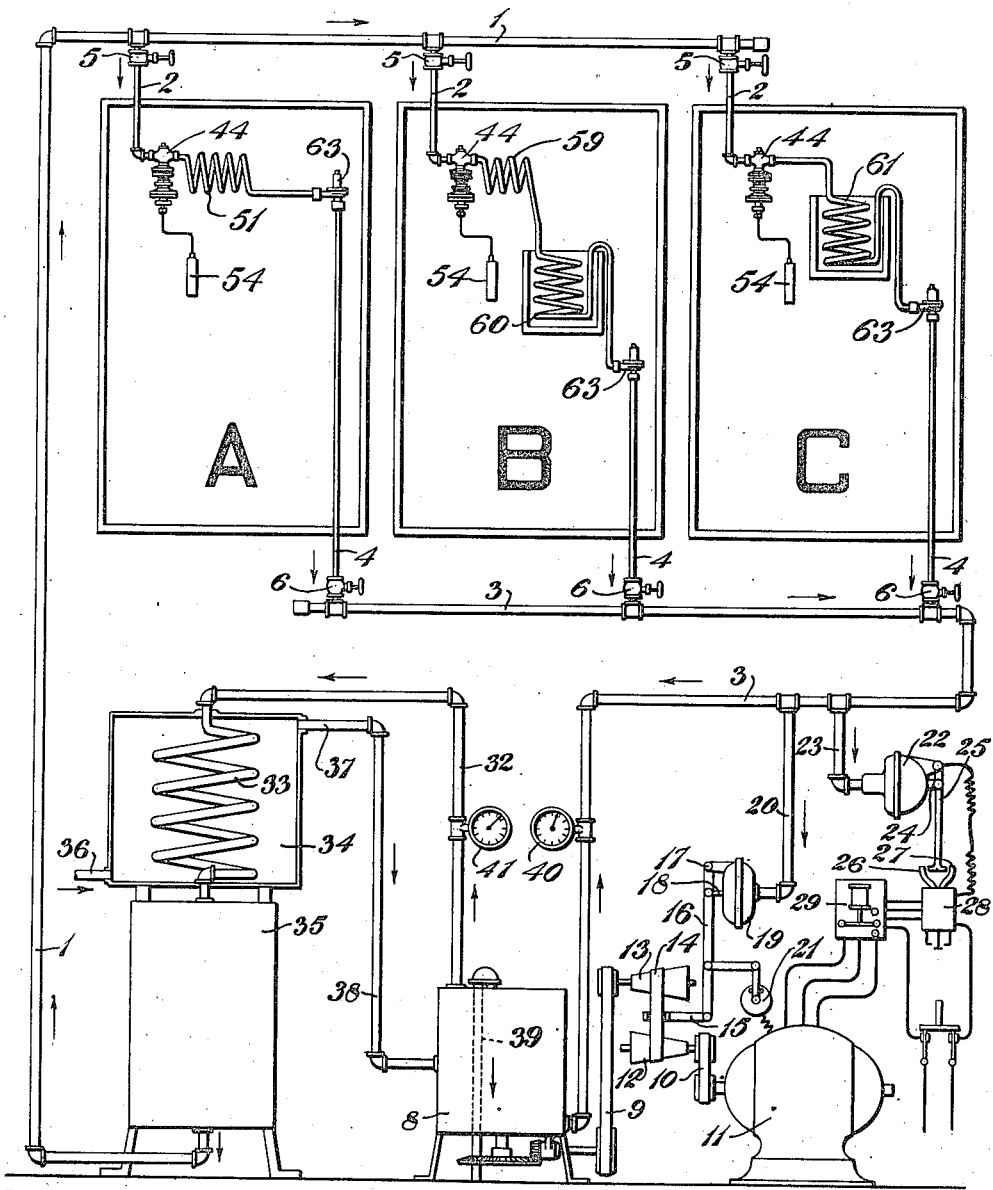

A. H. EDDY.
METHOD OF REFRIGERATION.
APPLICATION FILED JUNE 17, 1910.

1,185,597.

Patented May 30, 1916.
3 SHEETS—SHEET 1.

Witnesses:
S. S. Grotta
Charles F. Stono

Inventor:
Arthur H. Eddy
by W. H. Honiss
Attorney

A. H. EDDY.
METHOD OF REFRIGERATION.
APPLICATION FILED JUNE 17, 1910.
1,185,597.
Patented May 30, 1916.
3 SHEETS—SHEET 2.
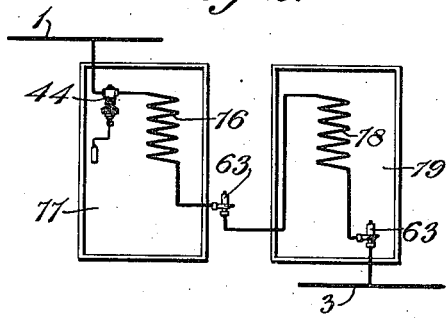
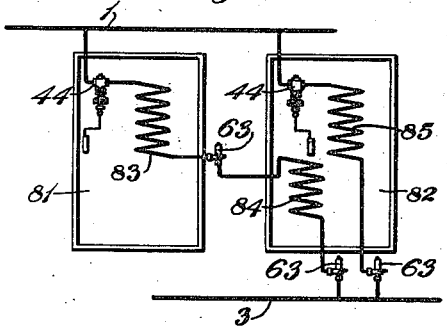
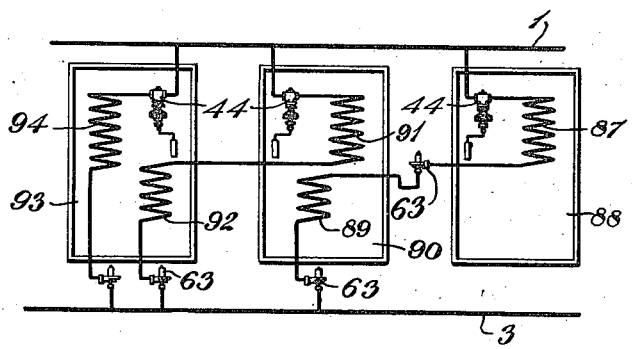
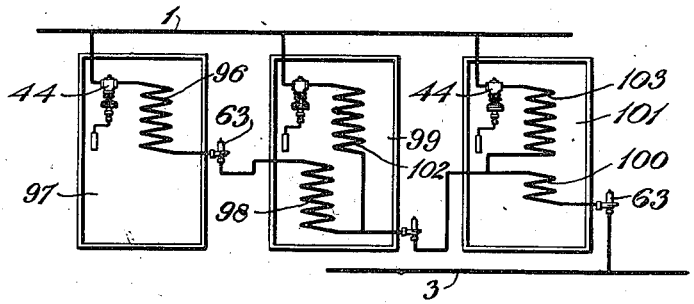
Witnesses:
S. S. Grotta
Charles H. Storrs
Inventor:
Arthur H. Eddy
by W. H. Honiss
Attorney.

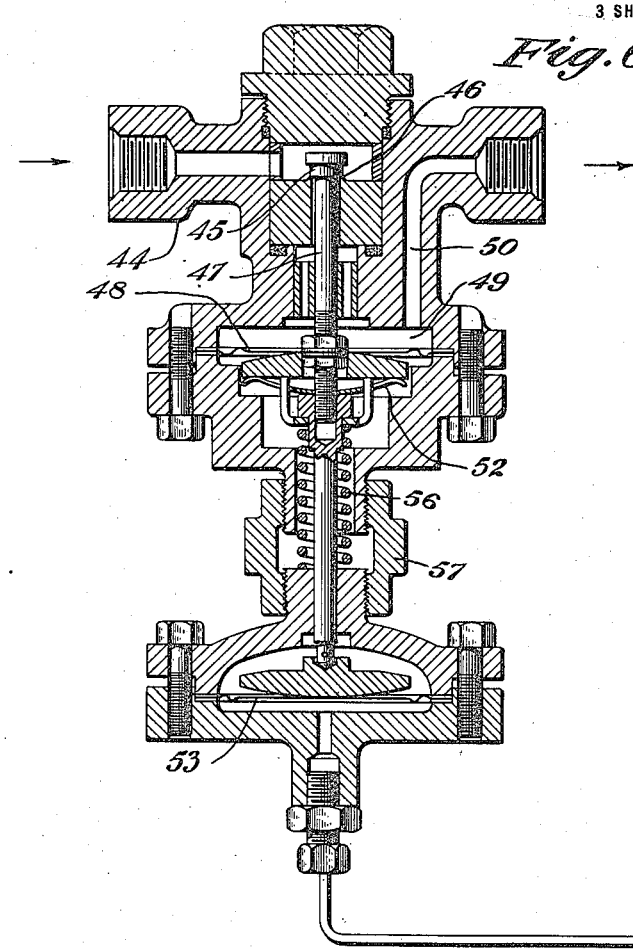
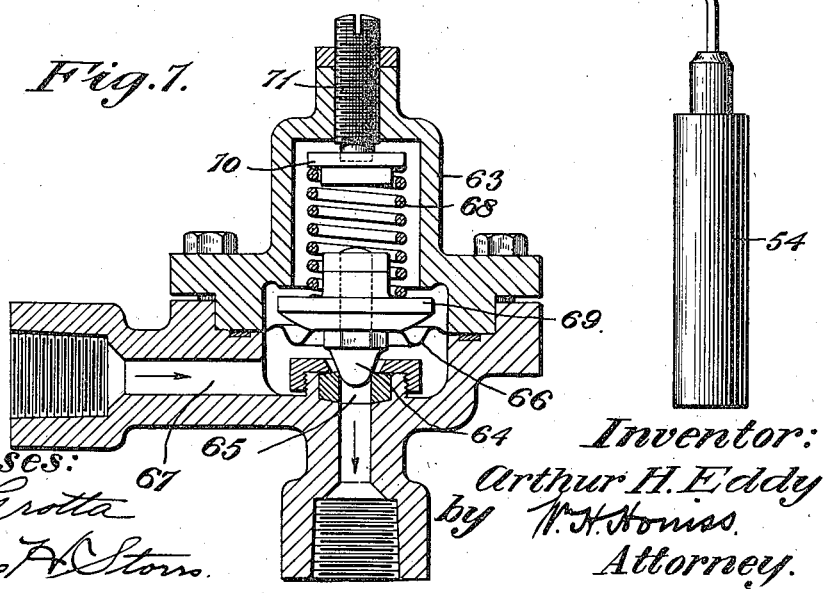

UNITED STATES PATENT OFFICE.

ARTHUR H. EDDY, OF WINDSOR, CONNECTICUT, ASSIGNOR TO CHARLES E. SHEPARD, OF HARTFORD, CONNECTICUT.

METHOD OF REFRIGERATION.

1,185,597. Specification of Letters Patent. Patented May 30, 1916.

Application filed June 17, 1910. Serial No. 567,408.

*To all whom it may concern:*

Be it known that I, ARTHUR H. EDDY, a citizen of the United States, and resident of Windsor, in the county of Hartford and State of Connecticut, have invented certain new and useful Improvements in Methods of Refrigeration, of which the following is a full, clear, and exact specification.

This invention relates to an improved method of practising artificial refrigeration. In the general practice of this art, a refrigerating fluid or gas, generally ammonia, is circulated under pressure in an endless system, in, or suitably adjacent to, the rooms or spaces to be cooled, at which portion of the system the ammonia is allowed to expand in an expansion coil or chamber to absorb heat through the walls of the coil or chamber from the space outside of those walls. The expanded ammonia fluid, or gas, with its absorbed heat, is then pumped or otherwise conducted to another part of the system, where it is recompressed, and cooled, to free it from the heat absorbed in the expansion coils, after which the fluid is again circulated through the system as it is needed. In this cycle of operation it is obviously desirable, not only for uniformity of action, but also for the sake of economy in the means, power and fuel required for recompressing the fluid, that the properties of the fluid be fully utilized each time it circulates through the system, varying from time to time in the amount and frequency of its flow, according to the varying requirements of the system. Where the room to be cooled is subject to uniform temperature conditions for extended periods, a suitably uniform or periodical flow of the ammonia is maintained with comparative ease, by various hand regulated devices of the prior art. But where some or all of the rooms or other spaces to be cooled are frequently opened and closed, the cold material taken out, and warm material substituted, the work to be done by the circulating fluid varies greatly in the different rooms, and in the same room. For example, the refrigerated rooms of a provision store ordinarily remain closed nights and Sundays, during which time fairly uniform conditions prevail. But during the business days, which alternate with the nights, some or all of the cold rooms are opened more or less frequently and irregularly, to take out the cooled goods and replace them with other goods containing more heat. That heat, with the heat directly admitted by the more or less irregular opening and closing of the doors, and varying in amount and temperature according to the season, should be absorbed by the refrigerating fluid at all times to suit these varying conditions, so as to maintain the temperatures desired in the respective rooms, more closely and uniformly than can be done by personal attendance, or by any hand or other devices known to me in the prior art.

A prime requisite for efficiency and economy is that the refrigerating fluid shall perform a regulated amount of work at each stage or cycle of its operation. To accomplish this, the refrigerating fluid should be admitted to the expansion coils and discharged therefrom only at such times, and in such quantities as are compatible with its proper expansion or vaporization, and consequent absorption of heat from the surrounding medium to be cooled. Having performed its required duty in any given expansion coil, if the medium surrounding the coil requires still further cooling, the fluid should be released in sufficient quantity and its place should be taken by the flow and expansion of the cooled and compressed fluid from the supply pipe in sufficient quantity and for the length of time required to reduce the temperature to the desired degree as the result of its proper expansion and consequent absorption of heat from the medium to be cooled; whereupon the further flow of the refrigerating fluid to and from that coil or chamber should be interrupted until the pressure, again rising above the prescribed degree, calls for a further flow and expansion of the fluid with the resulting absorption of the heat.

In cases where two or more refrigerators or cooling rooms are employed in the same establishment, it is desirable to operate and control them all in connection with a single circulating system and a single plant for recompressing and cooling the fluid, the inlets of the several expansion coils or chambers being connected with a single supply pipe, and all discharging either directly or ultimately into a common return pipe or system of pipes, leading to the compressing pump. In such cases it is desirable to prevent the backward inflow into any of the expansion chambers or coils, of refrigerating fluid previously discharged therefrom, or discharged from another expansion chamber or coil, which by its pressure and temperature is capable of either absorbing more heat from, or of transferring some of its own heat to rooms which are already at the desired temperature. In some instances, and especially where different rooms are to be maintained at different temperatures, it is desirable, for more complete efficiency, to employ the refrigerating fluid in a series relation to the rooms, absorbing heat from each in succession.

On account of the fluent and volatile character of the ammonia which is commonly employed as a circulating medium when under pressure, it passes with great ease and rapidity through very small openings leading into coils of lower pressure, especially under the pressures or differences in pressure commonly employed. For this reason the valves and their seats must fit accurately together, so as to close tight when it is desired to stop the flow, and to open to properly graduated and limited extents, in accordance with the requirements of service. In other words, the valves employed at points where differences of pressure may occur should be sensitive, and promptly and automatically responsive to the changes taking place during the absorption and transfer of the heat in the cooling chamber. It is found that hand regulated valves are unsuited for the purposes contemplated herein, since they are dependent upon personal attendance and operation, and even with the most careful and constant personal attention, only a rough approximation to proper regulating conditions can be obtained by their use. This is particularly true in any attempt to regulate different chambers to different temperatures. Even when such hand operated valves are most carefully adjusted according to the requirements of the respective refrigerating chambers which they are expected to maintain at different temperatures, those adjustments remain even approximately correct only during the uniform continuance of the exact conditions for which the valves were adjusted. Any change in the relative amount of heat to be absorbed from each chamber calls for a prompt and properly graduated change in the relative adjustment of the valves, which is impossible with hand regulated devices, even when the necessity and its extent are apprehended in season. Even if hand regulating valves could be adjusted accurately to allow of the proper volume of flow of the refrigerating fluid of different chambers, requiring the same or different temperatures, that adjustment would not be suitable for changes in pressure; and for that reason would be unsuited for the maintaining of different rooms at different temperatures and pressures by a single connected system; for the different pressures would obviously equalize through the different valves, even though the latter were opened to varying extents to suit the volume of flow required for the respective rooms or chambers. This is equally true whether such valves are employed at the inlets or outlets of the expansion coils or chambers. Moreover, they would permit backflow of fluid discharged from a chamber at a higher pressure into chambers intended for a lower pressure, where both discharge into a common return pipe.

A principal object of the present invention is to utilize and direct the natural and elemental properties and forces resident in the refrigerating fluid and in the heat absorbed in the different stages of its thermodynamic cycle while performing its functions in the process of refrigeration, and thereby to control automatically the flow of that fluid to suit the varying conditions and to accomplish the desired results.

A further object of the present invention is to provide for utilizing and directing the aforesaid elemental properties and forces of the heat and of the refrigerating fluid to automatically regulate and control the flow of refrigerating fluid, from a common source, to a plurality of cooling or refrigerating rooms and maintain the same or a different temperature in each, independently of the others; and also to discharge or release the expanded fluid with its varied conditions of heat and pressure, from the respective coils, into other coils or into a common return pipe, while avoiding backflow of the fluid discharged from the coils at a higher pressure into coils under a lower pressure. This enables different refrigerating rooms, supplied by the same circulating system of refrigerating fluid to be maintained at the different temperatures best suited for different purposes. This requirement very commonly exists in the same establishment; as for example in a provision warehouse or market, where it is desirable to maintain different commodities at different temperatures.

A still further object of the present invention is to utilize and direct the aforesaid properties and forces of the refrigerating fluid, and of the heat absorbed or to be absorbed thereby, in regulating and controlling the flow of the refrigerating fluid from a refrigerating chamber, in which the fluid has absorbed a proportionate amount of heat, to one or more additional chambers in series from which the same fluid may economically absorb a further amount of heat before being recompressed and cooled.

For the sake of clearness I have, in the accompanying drawings, illustrated, mainly in diagrammatic form, the present invention adapted to a variety of uses, modifications of which can be further greatly extended.

Figure 1 of the drawings is a diagrammatic representation of a circulating system embodying the present invention, illustrating three cooling chambers connected to the system in "parallel" arrangement. Figs. 2 to 5 inclusive are diagrammatic views representing different arrangements, and modifications of refrigerating chambers and their connections in the refrigerating system. Fig. 2 represents two chambers with their refrigerating means connected in "series". Fig. 3 represents two chambers arranged in a modified "series" relation. Fig. 4 represents three chambers connected in another modified "series" system. Fig. 5 shows three rooms or chambers combined and connected in a further modified "series" system. Fig. 6 is a side view in section taken through its longitudinal center, and in enlarged scale, of a form of inlet valve suitable for use in practising the method of the present invention, for admitting the refrigerating fluid to the respective expansion coils, under the joint control of the pressure of the refrigerating fluid in the coil, and of the heat yet to be absorbed, in the chamber around the coil. Fig. 7 is a similar view of an outlet valve suitable for practising the present method, adapted to regulate the outflow of the refrigerating fluid from the respective coils under the control of the pressure within the said coils.

A brief description will first be given of the principal features of the general system represented in Fig. 1. This shows three refrigerating rooms or chambers A, B and C, all of which receive refrigerating fluid from a single supply pipe 1, through the branch pipes 2; and all three discharge into a common return pipe 3, through the branch pipes 4. Each branch of the system is preferably provided with shut-off valves 5 and 6, to enable any one or more of the branches to be entirely shut off at will, when not wanted in the regular operation of the system. The expanded ammonia fluid, or gas discharged into the return pipe 3 is conducted to a pump 8, which may be driven in any convenient way, as by the belts 9 and 10, from the electric motor 11. It usually will be found convenient to vary the capacity of the pump 8 in accordance with the work being done; and this may be accomplished in several ways; for example, by varying the speed of the motor; or changing the speed in transmission, both of which ways are illustrated herein. The variable transmission device herein shown consists of the cone pulleys 12 and 13, provided with a belt 14, the position of which is controlled by a belt shifter 15, operated by a lever 16, pivoted at 17, and worked by its connection with the plunger 18, leading to a piston or diaphragm in the pressure chamber 19, which connects by means of the pipe 20 with the common return pipe 3. Increasing pressure in the return pipe, due to activity in the heat absorbing function, is thus transmitted to the pressure chamber 19, from which movement is transmitted by the described connection to the belt 14, shifting it to a position on the cone pulleys 12 and 13, which increases the speed of the pump, the parts being designed and proportioned so as to vary the speed in approximate proportion to the work being done. Or the lever 16 may be connected with the handle of a controller 21 employed to control the speed of the electric motor. It is also desirable in some, if not in most, instances, to provide for automatically stopping the pump when the discharge of expanded fluid ceases, and to automatically start the pump again whenever the rising pressure of the discharged fluid demands it. This is herein shown to be accomplished by means of a piston or diaphragm in a pressure chamber 22 connected by means of the branch pipe 23 with the common return pipe 3. The piston or diaphragm is connected by means of the rod 24 with the switch lever 25, and moves the said lever according to the pressure of gas in the return pipe into contact with the terminals 26 or 27, the wires of which lead to a circuit maker and breaker 28, connected with the motor starter 29, which in turn is connected with the motor 11. These electrical connections may be of various kinds, and are so well understood that no occasion is seen for describing them here in detail.

The pump 8 operates to draw in the expanded refrigerating fluid or gas from the return pipe 3, and recompress it. The compressed fluid leaves the pump through the pipe 32, which conducts it to any approved means for extracting the heat absorbed in its previous cycle of operation, and prepares it for the next cycle. The means herein shown consists of a coil 33 connected with the pipe 32 and immersed in water contained in the tank 34, passing thence into the storage tank 35, which in turn communicates with the supply pipe 1, leading to the rooms A, B, C, thus completing the endless system. The water in which the coil 33 is immersed is preferably supplied to the tank 34 through the inlet 36, near the bottom of the tank, and leaves the tank through the outlet 37 near the top of the tank. The same water may be conducted by the pipe 38 to the water-jacket of the pump 8, discharging therefrom through the outlet 39 into any convenient waste pipe.

Suitable gages 40 and 41 may be employed upon the return and pressure pipes and elsewhere, for visibly indicating the pressures.

The three rooms A, B and C are herein shown to be connected in "parallel" relation to the system, the operation of each branch system being confined to its own room. These three rooms are herein shown to be provided with different forms and arrangements of expansion coils, showing the adaptation of the system to diverse requirements. The refrigerating fluid conducted into each room or chamber by its branch supply pipe 2, is admitted to the expansion coils within the chambers, and after performing its allotted work is released and discharged through its branch outlet 4 into the common return pipe 3. According to the present invention, the flow of the refrigerating fluid to, through, and out of these coils, is automatically controlled by the elemental forces and properties of heat, expansion, and consequent pressure of the refrigerating fluid in the coil, opposed and counterbalanced to a degree by the expansive action of the heat yet to be absorbed from the room or chamber. Hence the flow may be said to be subject to the dual control of the heat already absorbed and confined in the coil, and of the heat yet to be absorbed.

Various forms of valves may be employed at the inlets and outlets of the coils, some of which are shown in my own prior patents. The inlet valve illustrated herein is of the automatic expansion type shown in my U. S. Patent 853,505, granted to me May 14, 1907. This valve as shown in Fig. 6 has a disk valve 45 located on the inlet side of the valve seat 46, the stem 47 of the valve is connected on the outlet side of the valve seat with a diaphragm 48, above which is a pressure chamber 49, to which the admitted refrigerating fluid passes when the valve 45 is opened, and from which it finds its way through the passage 50 to the expansion coil 51. Thus the diaphragm is subjected on one side to the pressure of the fluid in the chamber 49, due to the expansion of the refrigerating fluid in the coil 51, and is subjected on its opposite side to the pressure of a spring 52 interposed between the diaphragm 48 and another diaphragm 53, which upon its under side is exposed to the pressure due to the expansion of a liquid, such as alcohol in the thermic receptacle 54, which is placed in any desired portion of the room or compartment to be cooled. The under side of the diaphragm 48 is also subjected to the pressure of a spring 56, the tension of which can be adjusted by hand, by means of the right and left hand nut or turnbuckle 57, so as to adjust the balance of the opposing forces within the valve to suit desired temperatures. The details of construction of this valve are fully shown and described in my aforesaid Patent No. 853,505.

The expansion coils may be disposed in any convenient or desired way within the chambers, and may be employed in direct contact with the air, as in the case of the coils 51 and 59 in the rooms A and B; or they may be placed in tanks or boxes, as shown by the coils 60 and 61. The coils may also be employed for cooling brine; and in fact may be applied to any purposes now known in mechanical or artificial refrigeration. A preferred form of outlet or discharge valve is shown in Fig. 7. The valve head 64, for opening and closing the outlet port 65, is mounted on, or connected with a diaphragm 66, the under side of which is subjected to the pressure in the coil, connected with the passage 67. The valve is yieldingly held to its seat by means of a spring 68, interposed between the disk plate 69 and a collar 70. The tension of the spring may be adjusted by means of the screw 71, so as to hold the valve head 64 closed until overcome by the desired or predetermined pressure of expanded fluid in the coil. Thus the flow of cooling fluid through the coil is automatically controlled at both ends of the coil by variations in the opposing and correlated pressures. When the temperature in a cooling room reaches a desired or prescribed point, these opposing forces are in equilibrium, and the valves close and remain closed, thereby stopping all flow of the refrigerating fluid. As the temperature in the room is raised by the opening of the door or otherwise, it takes effect upon the thermic receptacle 54, and by the consequent expansion raises the diaphragm 53, and opens the valve 45, overcoming the pressure against the upper side of the diaphragm 48 of the fluid or gas already in the coil 51, and confined therein by the closed outlet valve 63. The expansion of the newly admitted fluid absorbs more heat from the room, thereby increasing its own pressure, and continuing until it has absorbed a regulated amount or proportion of the heat. As the heat is transferred from the outside to the inside of the coils, the opposing forces again approach a balance, closing the valve 45, as soon as the proper temperature relation is reached. If a considerable amount of heat is to be absorbed, due to the frequent opening of the room, or from any other cause, the expansive action within the thermic receptacle 54 continues in accordance with the heat to be absorbed, thereby keeping the valve 45 open against the closing action of the pressure in the coils. The tension of the outlet valve 63 is adjusted to a point which will hold the refrigerating fluid in the coil up to the point at which it receives its desired amount of heat, beyond which point the increasing pressure of the fluid opens the valve 63, and permits the heated fluid to discharge into the return pipe 3, in the arrangement represented in Fig. 4; or into the coils of other chambers in the systems illustrated in Figs. 2 to 5 inclusive. The area of the outlet port 65, the tension of the spring 68, and the area of the diaphragm 66 are so proportioned as to prevent the return flow of heated fluid that has been discharged from the same or another coil. This, especially in the case of rooms maintaining different temperatures, effectually prevents the backward flow of fluid or gas at a higher pressure, into a coil intended for a lower pressure. This prevents any backward transfer of heat which has once been absorbed. This internal control of the flow of the liquid through the rooms to be refrigerated, entirely eliminates the external control or influence of the varying pressures in the return pipe 3 and its branches, and of the pump employed for recompressing the fluid. It is desirable to avoid this external control or influence because of the variations of pressure in the return pipe, and in the operation of the pump, especially in the case of a common exhaust from a plurality of chambers in which different temperatures are to be maintained.

As an illustrative example, it may be assumed that in the parallel arrangement illustrated in Fig. 1, the chambers A, B and C are to be maintained at temperatures of 40, 30 and 20 degrees, respectively, and that the coil temperatures are about 20 or 25 degrees below the respective chambers, in which case the coils work at temperatures of approximately 15, 5 and 0 degrees, respectively. By reference to standard tables showing the properties of saturated ammonia gas, it will be found that the equivalent gage pressures for these temperatures are about 28, 20 and 15 pounds, respectively. Therefore, the outlet valves 63 are adjusted to release at pressures of 28 pounds from the coil 51 of the room A, at 20 lbs., from the coils 59 and 60 of the room B, and at 15 lbs. from the coil 61 of the room C. The working pressure in the supply pipe 1 is assumed to be about 140 lbs. The inlet valves are adjusted so that with these back pressures of 28, 20 and 15 lbs., respectively, they will be opened by their respective thermostatic receptacles 54 in opposition to these back pressures, when the temperatures of their respective chambers exceeds the assumed limits of 40, 30 and 20 degrees for the chambers A, B and C, respectively. Under these conditions, starting from equilibrium, a rise of temperature in one of the chambers would operate through its thermostat 54 to open the inlet valve 44, thus admitting a supply of ammonia, which by its expansion in the coil would, as well understood, absorb heat from the chamber. This absorption of heat would increase the pressure of the gas in the coil until it overcomes the resistance of the gas outlet valve. This transfer of the heat from the chamber and its conversion into pressure in the coil serves to balance the forces controlling the inlet valve, so as to close it; the falling pressure from the thermostat 54 being overcome by the rising back pressure in the coil. If the coil is small relative to the size of the chamber, or if the chamber is frequently opened and more heat admitted, then the continuing pressure from the thermostat is not overcome by the rise of pressure in the coil, due to its absorption of heat. In such cases the expansion in the coil overcomes the resistance of the outlet valve, and escapes through the valve without closing the inlet valve, which in response to the need thus indicated by the still unbalanced forces of admitted heat and its conversion to pressure in the coil, continues to flow into the coil and continues to expand and thus continues the absorption of heat until the temperature is reduced sufficiently to allow the inlet valve to close by the forces coming to an equilibrium, with the temperature at the desired point, and the pressure in the coil just failing to overcome the resistance of the outlet valve, thus stopping the flow of the fluid and the consequent waste of energy needed to recompress it. Obviously in this parallel system or arrangement illustrated in Fig. 1, different temperatures desired in the different chambers A, B, C, are obtained by suitable adjustment of their respective inlet and outlet valves, so that the elemental forces in each will be balanced at the various desired temperatures.

In the series arrangement shown in Fig. 2 as an illustrative example, it may be assumed that the rooms 77 and 79 are to be maintained at temperatures of 35 and 25 degrees Fahrenheit, respectively; and that this requires the coils 76 and 78 to be respectively maintained at 15 degrees and 5 degrees Fahrenheit. It is assumed also that the relative sizes and uses of those rooms are such that room 79 gives up to its refrigerating coil 50% more heat than room 77 does to its coil. It is also assumed that the supply pipe 1 supplies liquid ammonia at 75 degrees Fahrenheit at the pressure corresponding to the pressure of saturated ammonia vapor at that temperature, namely about 125 pounds per square inch gage pressure. The outlet valves 63 of rooms 77 and 79 are set at 63 and 19 pounds, respectively, gage pressure. The inlet valve 44 is adjusted to furnish refrigerating fluid in such quantity that each pound of the fluid absorbs about 160 British thermal units from room 77. Each pound of the fluid will also absorb 50% more than this from room 79, or 240 B. T. U. Under these circumstances the fluid at the exhaust end of coil 76 will consist of about 55% liquid and 45% vapor, while the fluid at the exhaust end of the coil 78 will be about 7% liquid and 93% vapor.

Various ways are illustrated in Figs. 2 to 5 inclusive, of the adaptation of the system in a series relation to a plurality of refrigerating rooms or chambers. In Fig. 2 the coil 76 of the chamber 77 discharges into the coil 78 of the chamber 79. These coils are provided as shown in the figure with inlet and outlet valves 44 and 63 of the general character previously described herein, operating under the control of the heat absorbed and to be absorbed for regulating the flow of refrigerating fluid, and preventing the return flow.

In the arrangement shown in Fig. 3, the two rooms or chambers 81 and 82 are served by a branch arranged in series, consisting of the coil 83 in the room 81, discharging into the coil 84 in the room 82. In this arrangement, however, the room 82 is provided with an additional auxiliary or supplemental branch of the system, operating through the coil 85. So long as the heat absorbing capacity of the coil 84 is sufficient to keep the room 82 at the desired temperature, the auxiliary coil 85 remains inactive, its inlet valve 44 being kept closed by the action of its thermic receptacle 54, as previously described. But when, for any reason, the coil in room 81 is inactive, or if active the fluid discharged therefrom is incapable of absorbing the heat from room 82 with sufficient rapidity, the temperature rising above the point predetermined for that room, operates through the thermic receptacle 54 to open the valve 44, thus admitting a supply of fluid to the coil 85 which operates as already described, until the temperature is reduced to the desired point.

In the arrangement shown in Fig. 4, three rooms are provided with expansion coils arranged in a series relation, with an auxiliary branch in the third or last room. The coil 87 in the first room 88 receives its fluid from the common supply pipe 1 through the inlet valve 42 as required, and as determined by the balance of the opposing action of the fluid in the coil 81 and in the thermic receptacle 54, as previously described. The fluid released or discharged from the coil 87 through the outlet valve 63 passes through a coil 89 in room 90 whence it is discharged through another outlet valve 63 into the common return pipe 3, this branch thereby acting in series in the two rooms 88 and 90. A similar branch of the system acts in series through the coil 91 in the room 90, and the coil 92 in room 93. In addition to this series relation, the room 93 is provided with an auxiliary branch system of its own, operating through the coil 94. These coils are provided with the inlet valves 44 and outlet valves 63, previously described.

A still further modified arrangement is shown in Fig. 5, in which the expansion coil 96 in the room 97 connects in series with the coil 98 in the room 99, and with the coil 100 in room 101. An auxiliary branch coil 102 in room 99 receives the refrigerating fluid independently, under its own control, from the common supply pipe 1, and discharges into the pipe connecting the coils 98 and 100 in series, thus itself becoming auxiliary to the series. Similarly in room 101 an auxiliary branch coil 103 receives refrigerating fluid independently from the supply pipe 1, and discharges into the pipe connecting the series of coils common to the three rooms.

These various modifications show some of the different ways in which this system may by intelligent judgment and selection be adapted to various conditions. In each case the flow of the refrigerating fluid to and through the respective coils is governed by the local conditions. The influence of the heat to be absorbed, and the pressure produced within the coil by the heat absorption and consequent expansion of the fluid confined therein by the outlet valve are constantly opposed to each other, being balanced so as to close the inlet valve when the room is reduced to the desired temperature, and to open the inlet valve when the temperature is above the desired point, serving also to open the outlet valve when the pressure in the expansion coil, caused by the absorption of heat, indicates that it has absorbed its desired amount or quota of heat, and that a further flow of the refrigerating fluid is needed to absorb the remaining heat.

An important advantage of the present system is its adaptation to maintain different rooms connected with the same system, at different temperatures, independently of each other. In the parallel arrangement of the system, illustrated in Fig. 1, each room is cooled by a single independent coil, and any room may be carried at the desired temperature. But in a series arrangement of the system, where it is desired to maintain different temperatures in the different rooms, the series arrangement should preferably be so that the flow will be from rooms requiring higher temperature to rooms requiring lower temperature, so that the gas after absorbing an economical amount of heat from a given chamber, passes to a chamber in which lower temperature is required, and by further expansion is adapted to absorb heat therefrom and thereby lower the temperature. For example, in the arrangement shown in Fig. 3, it may be assumed that the room 81 is to be maintained at 15 degrees, and the room 82 at 10 degrees. In this case the fluid, after absorbing a suitable amount of heat in the expansion coil from the room 81, passes to and is released into the coil 84 in the room 82, in which it undergoes a further expansion, and is thereby adapted to absorb an additional amount of heat.

In the arrangement shown in Fig. 9, the gas in the coil 87, having absorbed heat from the room 88 and thus reduced the temperature of that room to an economical degree relative to its desired temperature, passes to and expands in the coil 89, thus absorbing heat from the chamber 90. Similarly, the gas in the coils 91 and 92 perform a due proportion of the work of absorbing the heat in the chambers 90 and 93, acting in the chamber 90 in conjunction with the series coil 89 and the auxiliary coil 94. In the system illustrated in Fig. 5, the series arrangement is shown to extend into the three chambers, taking from each its permissible amount or quota of heat.

These cooling rooms, or the separate expansion coils, may be regarded as independent units, which may be assembled with other similar units at the pleasure of the designing engineer, in series or in parallel, on in both ways. The coils may receive their refrigerating fluid in series from each other, when the conditions are such that the gas or fluid discharged from one coil is still capable of doing useful work by further expansion in another coil, thus exhausting its heat absorbing capacity before being finally discharged into the common return pipe. Suitable auxiliary or supplemental coils may be provided wherever required, receiving their supply directly from the common supply pipe 1, automatically remaining closed as long as they are not required; but automatically opening and coming into action as soon as their services are called for. A plurality of cooling rooms thus equipped and connected in the system either in series or in parallel, or both, may be maintained at different desired temperatures, receiving their refrigerating fluid from a common source of supply, utilizing to the utmost its heat absorbing capacity and returning it to the pump through a common return pipe, without any backflow or other interference between the respective coils or rooms. Not only are the services and attention of human operators dispensed with, but a much greater efficiency is secured than could be obtained by the most careful and devoted personal attention and services, because of the constant readiness and prompt response and efficient action of the system. This is due primarily to the fact that the system is at all times under the control of the elemental forces and properties of the heat which is being absorbed. The heat yet to be absorbed outside of the coils acts through the thermostat or thermic receiver 54 in a direction to open the inlet valve, thus tending to admit more fluid, while the heat already absorbed by the coil expands the refrigerating fluid, the increasing pressure of which acts upon the inlet valve and opposes its opening action; and at the same time extends forward to the outlet valve, tending to open it. When the desired temperature is reached in the cooling room, these forces are balanced and the refrigerating fluid is held back, thus preventing its waste by unnecessary action, with the consequent necessity for recompression. A disturbance of the balance of the elemental forces promptly operates to start the refrigerating action, which is kept up with an activity suited to varying requirements, until the temperature is again reduced to the required degree, and the forces again balanced. Thus the system goes on indefinitely.

It will be understood that this invention is not limited to the specific arrangements herein shown or suggested, since the invention can and should be adapted to different conditions in various ways, according to the skill and judgment of some one familiar with this art. Nor are the particular forms of coils or chambers or valves shown herein essential to its operation, since these may also be varied to suit different conditions.

I claim as my invention:—

1. The method of refrigeration, which consists in confining a portion of a supply of refrigerating fluid within the influence of the space to be cooled, from which the heat is absorbed by the expansion of the fluid, and directing the resultant variations of pressure of the confined fluid to control the release of the expanded fluid and the admission of a further supply of the fluid.

2. The method of refrigeration, which consists in confining a portion of a supply of refrigerating fluid within the influence of the space to be cooled, from which the heat is absorbed by the expansion of the fluid, directing the resultant rising pressure to release some of the confined fluid, and also utilizing the subsequent resultant falling of the pressure to control the admission of a further supply of fluid.

3. A continuous and self-regulating method of refrigeration, which consists in yieldingly confining a portion of a supply of refrigerating fluid in an expansion coil or chamber, whereby heat is absorbed by the expansion of the fluid within the coil, and utilizing the resultant successive increases of pressure within the coil to release successive portions of the expanded fluid, and also utilizing the successive resultant lowering of pressure to regulate the admission of a further supply of fluid to the coil or chamber.

4. The method of automatically controlling the expansion and flow of refrigerating fluid through an expansion coil or chamber, which consists in admitting successive supplies of the fluid to the coil and releasing successive portions of the expanded fluid from the coil, both under the control of the variations of the pressure in the coil.

5. A process of refrigeration, which consists in yieldingly confining a portion of a supply of refrigerating fluid, expanding the confined fluid and increasing its pressure by the absorption of heat from its surroundings, utilizing the pressure to automatically release a portion of the expanded fluid, and also utilizing the same pressure in conjunction with the changes of temperature induced by the absorption of surrounding heat to automatically regulate the admission of more fluid from the supply.

6. A process of refrigeration, which consists in yieldingly confining a portion of a supply of refrigerating fluid, expanding the confined fluid and increasing its pressure by the absorption of surrounding heat, utilizing the rising pressure to automatically and successively release portions of the expanded fluid and also opposing the same pressure to the thermostatic effect of rising temperature in the said surroundings to automatically regulate the admission of more refrigerating fluid from the said supply.

7. The method of automatically regulating the flow of refrigerating fluid from a common source, and maintaining desired temperatures in different chambers independently of each other, which consists in yieldingly confining portions of the fluid within the respective chambers, expanding the respective portions of fluid and increasing their pressure by the absorption of surrounding heat, and utilizing the rising pressure of each expanding portion to automatically and successively release the expanded fluid, and to utilize the resultant reduction in pressure to regulate the admission of more fluid from the common source of supply.

8. The method of automatically regulating the flow of refrigerating fluid from a common source, to maintain the same temperature or different temperatures in a plurality of refrigerating chambers, which consists in yieldingly confining portions of the fluid in different expansion coils for the respective chambers, and utilizing the rising pressure of the fluid confined in each coil to release expanded fluid from and hold back fresh fluid from that coil; and also directing thermostatic pressure under the influence of the changing temperatures of the respective chambers to assist the admission of fresh fluid to their respective coils.

9. The method of automatically regulating the flow of refrigerating fluid from a common source in series relation through a plurality of refrigerating chambers to maintain desired temperatures in each chamber independently of the others, which consists in separately confining the fluid for the respective chambers, and directing thermostatic pressure in each chamber under the influence of rising temperature in that chamber to admit more fluid and also utilizing the pressure of the confined fluid within each chamber to oppose the said admission of more fluid to that chamber.

10. The method of automatically regulating the flow of refrigerating fluid from a common source in series relation through a plurality of refrigerating chambers to maintain desired temperatures in each chamber independently of the others, which consists in separately confining the fluid for the respective chambers, and directing thermostatic pressure in each chamber under the influence of rising temperature in that chamber to admit more fluid and also utilizing the pressure of the confined fluid within each chamber to oppose the said admission of more fluid to that chamber, and also in conducting the released fluid from one chamber to another chamber, thereby utilizing the same fluid in a succession of chambers to absorb heat from each in succession.

In witness whereof I have signed my name to this specification in the presence of two subscribing witnesses, this 13th day of June, 1910.

ARTHUR H. EDDY.

Witnesses:
CHARLOTTE S. HULL,
CAROLINE M. BRECKLE.